(12) United States Patent
Kaufman et al.

(10) Patent No.: US 7,494,711 B2
(45) Date of Patent: Feb. 24, 2009

(54) COATED PLASTIC BEADS AND METHODS OF USING SAME TO TREAT A WELLBORE OR SUBTERRANEAN FORMATION

(75) Inventors: Phillip B. Kaufman, Conroe, TX (US); Harold D. Brannon, Magnolia, TX (US); D. V. Satyanarayana Gupta, The Woodlands, TX (US)

(73) Assignee: BJ Services Company, Houston, TX (US)

( * ) Notice: Subject to any disclaimer, the term of this patent is extended or adjusted under 35 U.S.C. 154(b) by 131 days.

(21) Appl. No.: 11/371,139

(22) Filed: Mar. 8, 2006

(65) Prior Publication Data

US 2007/0209794 A1 Sep. 13, 2007

(51) Int. Cl.
*B32B 5/16* (2006.01)

(52) U.S. Cl. .................. 428/403; 428/404; 428/405; 428/406; 428/407; 166/280.1; 166/280.2; 507/117; 507/125; 507/219; 507/220; 507/231; 507/249

(58) Field of Classification Search .................. 428/403, 428/404, 405, 406, 407; 166/280.1, 280.2
See application file for complete search history.

(56) References Cited

U.S. PATENT DOCUMENTS

| | | | |
|---|---|---|---|
| 4,732,920 A | 3/1988 | Graham | |
| 5,531,274 A * | 7/1996 | Bienvenu, Jr. | 166/280.2 |
| 5,801,116 A | 9/1998 | Cottrell et al. | |
| 6,059,034 A | 5/2000 | Rickards et al. | |
| 6,248,838 B1 | 6/2001 | Albright | |
| 6,330,916 B1 | 12/2001 | Rickards et al. | |
| 6,364,018 B1 | 4/2002 | Brannon et al. | |
| 6,508,305 B1 | 1/2003 | Brannon et al. | |
| 6,582,819 B2 | 6/2003 | McDaniel et al. | |
| 6,599,863 B1 | 7/2003 | Palmer et al. | |
| 6,632,527 B1 | 10/2003 | McDaniel et al. | |
| 6,772,838 B2 | 8/2004 | Dawson et al. | |
| 2004/0040708 A1 | 3/2004 | Stephenson et al. | |
| 2005/0263283 A1 | 12/2005 | Nguyen | |
| 2005/0274523 A1 | 12/2005 | Brannon et al. | |
| 2005/0284631 A1 | 12/2005 | Nguyen et al. | |

FOREIGN PATENT DOCUMENTS

| | | |
|---|---|---|
| EP | 1 426 551 A1 | 6/2004 |
| GB | 2319796 B | 8/2001 |

OTHER PUBLICATIONS

Diversified Industries Ltd.; "Lightweight Proppant Product Development".
Rhodia Engineering Plastics; "Technyl® Polyamide Range"; pp. 1-11; Challenging Boundaries.
Darin, S.R., Huitt, J.L.; "Effect of a Partial Monolayer of Propping Agent on Fracture Flow Capacity" (SPE 1291-G); Petroleum Transactions, AIME; 34th Annual Fall Meeting of SPE; Oct. 4-7, 1959, Dallas, Texas; pp. 31-37.
Brannon, Harold D. et al; "Maximizing Fracture Conductivity wiht Proppant Partial Monolayers: Theoretical Curiosity of Highly Productive Reality?" (SPE 90698); Society of Petroleum Engineers Inc.; 2004; pp. 1-23.
Parker, M. et al; "High-Porosity Fractures Yield High Conductiity" (SPE 96848); Society of Petroleum Engineers Inc.; 2005; pp. 1-10.

* cited by examiner

*Primary Examiner*—Leszek Kiliman
(74) *Attorney, Agent, or Firm*—Jones & Smith, LLP; John Wilson Jones

(57) ABSTRACT

Plastic beads, including polyamides and polystyrene beads crosslinked with divinylbenzene, having a curable resin coating are highly useful for sand control and/or hydraulic fracturing of subterranean. The curable resin coated plastic beads preferably have an apparent specific gravity less than about 1.5.

34 Claims, 1 Drawing Sheet

COATED PLASTIC BEADS AND METHODS OF USING SAME TO TREAT A WELLBORE OR SUBTERRANEAN FORMATION

FIELD OF THE INVENTION

This invention relates to methods and compositions useful for subterranean formation treatments, such as hydraulic fracturing treatments and sand control. In particular, this invention relates to use of curable resin coated plastic beads having low specific gravity (ASG) in sand control methods such as gravel packing, frac pack treatments, etc., as well as proppant material in hydraulic fracturing treatments.

BACKGROUND OF THE INVENTION

Typically, it is necessary, when producing oil and/or gas from an unconsolidated subterranean formation, to prevent sand grains and/or other formation fines from migrating into the wellbore and being produced from the well. The production of such particulates can reduce the rate of hydrocarbon production from the well and can cause serious damage to well tubulars and to well surface equipment.

Gravel packs are often used to control particulate migration in such producing formations. A gravel pack typically consists of a mass of particulates which are packed around the exterior of a screening device. Such screening devices, typically positioned in an open hole or inside the well casing, have very narrow openings which are large enough to permit the flow of formation fluid but small enough to allow the particulates to pass through. The particulates operate to trap, and thus prevent the further migration of, formation sand and fines which would otherwise be produced along with the formation fluid.

In order to be useful in gravel packing applications, such particulates must exhibit high strength and be capable of functioning in low permeability formations. Ultra lightweight (ULW) particulate materials have been proposed for use in gravel packing applications to improve transport, placement, and packing efficiency. Concerns exist however that ULW particulate materials do not demonstrate the acid and chemical resistance properties required of particulates for use in gravel packing.

U.S. Pat. No. 5,531,274 reports the use of polystyrene divinylbenzene (PSDVB) beads for use in hydraulic fracturing at temperatures up to about 150° F. PSDVB beads have been reported to reduce fluid velocity required to maintain proppant transport within the fracture. This, in turn, provides for a greater fracture area to be propped. When used as a proppant, PSDVB beads, while offering excellent compressive strength, often soften and loose their compressive strength especially at high temperature and high pressure conditions.

While PSDVB beads have sufficient strength, acid resistance and low ASG for use as ULW in gravel packing treatments, they are unfortunately subject to fluidization and flowback and thus are unacceptable for such use.

Alternative ULW materials of low ASG which exhibit high particle strength, acid resistance and which are not subject to fluidization and flowback have been sought to improve transport, placement and packing efficiency.

SUMMARY OF THE INVENTION

Plastic beads provide highly desirable results in gravel packing when the beads are coated with a curable resin. The beads preferably have an apparent specific gravity (ASG) less than about 2.0, more preferably less than or equal to 1.5, and exhibit high acid and chemical resistance. Polystyrene beads crosslinked with divinylbenzene (PSDVB) as well as polyamide beads are preferred as the plastic beads.

The curable resin coating facilitates consolidation of the plastic beads once the pack is in place. Preferred curable resins include phenolic resins, epoxy resins, furan resins, phenolic formaldehyde resins, melamine formaldehyde resins, urethane resins and phenolic and furan resin mixtures.

In a preferred embodiment, the plastic beads are substantially neutrally buoyant in the carrier fluid introduced into the wellbore. (As used herein, the term "carrier fluid" shall include pumping and fracturing fluids.)

The plastic particulates are useful in gravel packing procedures wherein a screening device is placed in the wellbore and the plastic beads are then introduced such that they are packed around the exterior of the screening device. The packed plastic beads provide a fluid-permeable barrier around the screening device which is operable for preventing the migration of formation particulates into the screening device.

The plastic beads may further be introduced into a portion of the wellbore extending into the subterranean formation such that the beads are packed in the wellbore to provide a fluid-permeable barrier which is operable for preventing the migration of formation particulates. Formation fluid is then produced through the packed particulate bed.

The plastic beads may further be used to stimulate a subterranean formation such that they are deposited in the fracture and thus provide a fluid permeable region within the formation.

The curable resin coated plastic beads provide permeability levels and production rates substantially superior to those provided by the ULW particulates of the prior art while providing excellent control of formation sand and formation fines.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
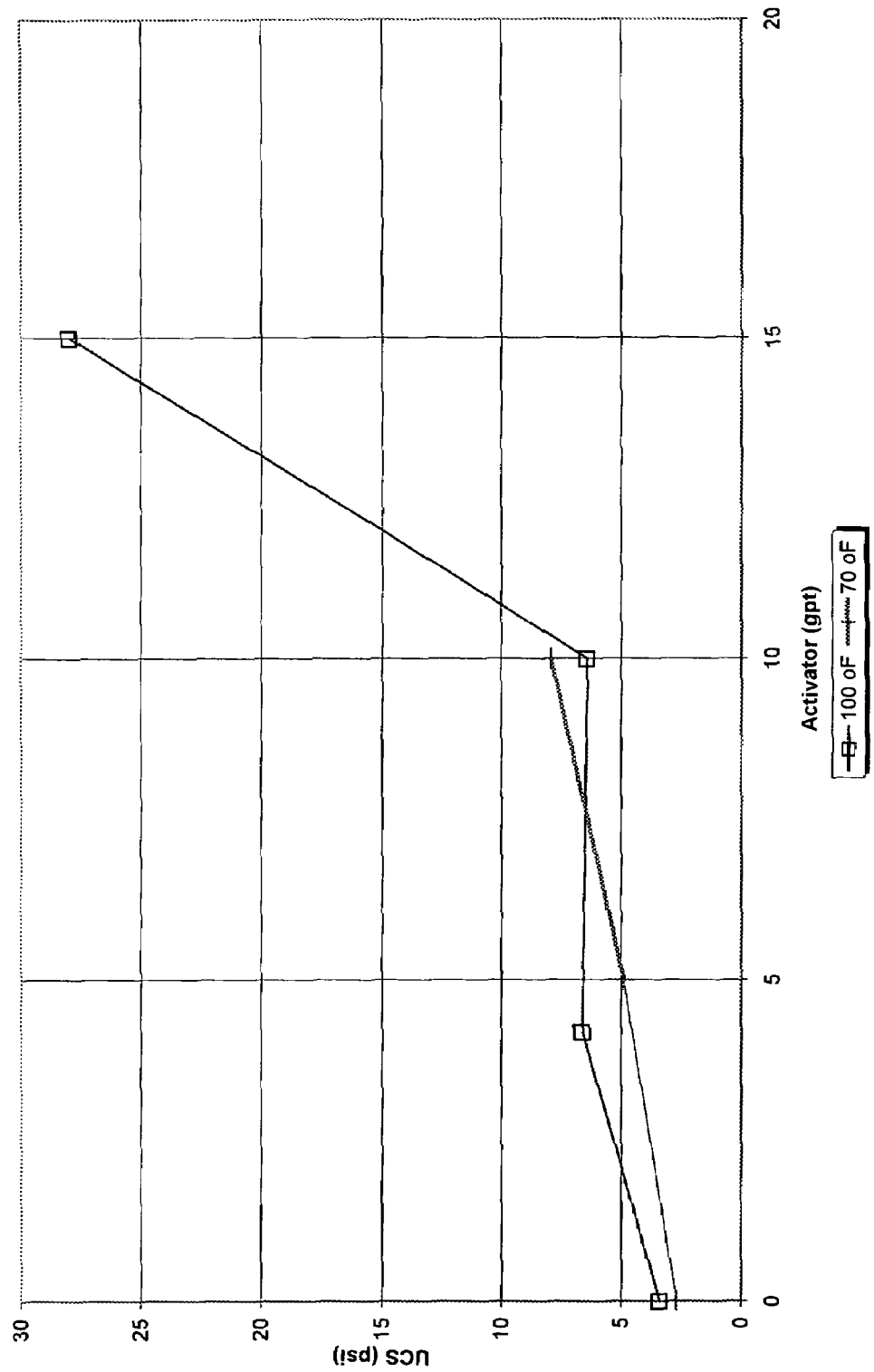
FIG. 1 contrasts the compressive strength and permeability of curable resin coated PSDVB beads at 100° and 70° F.

Plastic beads having a coating of a curable resin exhibit sufficient strength for use as ultra lightweight particulates in sand control methods, such as gravel packing and frac pack treatments, as well as hydraulic fracturing. The curable resin coated plastic beads exhibit high acid and chemical resistance.

The plastic beads typically have an apparent specific gravity (ASG) of 2.0 or less, preferably less than or equal to 1.5, preferably less than about 1.15 and most preferably less than about 1.07. In a particularly preferred mode, the beads are polystyrene divinylbenzene beads having an ASG of about 1.05. The beads are typically highly spherical. In a preferred embodiment, the plastic beads are those commercially available from Sun Drilling Products Corp. of Belle Chasse, La.

The resin coating on the plastic beads is not fully cured. The resin principally functions in proppant flowback control. When pumped downhole, the resin typically completes the curing process at temperatures of about 100° F., as proppant particulates adhere to each other. The presence of the curable resin on the plastic beads facilitates consolidation of the pack once the beads are introduced into the formation.

Preferred curable resins include phenolic resins, epoxy resins, furan resins, phenolic formaldehyde resins, melamine formaldehyde resins, urethane resins (especially low volatile urethane resins) and phenolic and furan resin mixtures.

The resin coating is generally present in the curable resin coated plastic bead in an amount of from about 4% to about 10% by weight of total weight. The thickness of the resin coating is generally between from about 0.5 to about 4 microns.

The curable resin coated plastic beads exhibit crush resistance under conditions of high stress, API RP 56 or API RP 60, generally at conditions greater than 2,000 psi closure stress.

The plastic beads are beads of crosslinked polymers derived from monomers containing an ethylenic bond, such as acrylate esters, methacrylate esters, vinyl acetate, styrene, vinylnaphthalene, vinyltoluene, allyl esters, olefins, vinyl chloride, allyl alcohol, acrylonitrile, acrolein, acrylamides, methacrylamides, vinyl fluoride, vinylidene difluoride, polyfunctional acrylates, methacrylates, acrylamides, methacylamides and polyunsaturated hydrocarbons, etc.

The polymers may be crosslinked with divinylbenzene as well as trimethylolpropane trimethacrylate, trimethylolpropane triacrylate, trimethylolpropane dimethacrylate, trimethylolpropane diacrylate, pentaerythritol tetramethacrylate, pentaerythritol trimethacrylate, pentaerythritol dimethacrylate, pentaerythritol tetraacrylate, pentaerythritol triacrylate, pentaerythritol diacrylate, bis(methacrylamides), polyolefins, polyethyleneglycol dimethylacrylates, polyethyleneglycol diacrylates, ethyleneglycol dimethacrylate, ethyleneglycol diacrylate, diethyleneglycol dimethacrylate, diethyleneglycol diacrylate, triethyleneglycol dimethacrylate and triethyleneglycol diacrylate.

Suitable plastic beads include rigid chain entanglement crosslinked polymers such as those set forth in U.S. Pat. No. 6,248,838, herein incorporated by reference.

The plastic beads are preferably polystyrene beads crosslinked with a crosslinker, such as divinylbenzene (PS-DVB). In another preferred embodiment, the plastic beads are polyamides, such as polyamide-6, 6 as well as polyamide 6, like the Technyl® polyamides from Rhodia Engineering Plastics. Further suitable polyamides are polyamide 6,10; polyamide 6,12; polyamide 4,6, polyamide 11 and polyamide 12.

Preferably, such beads have a sphericity of about 0.9 from API RP 58, an important parameter for gravel packing as higher sphericity equates to relatively high permeability. The increased propensity for flowback created by such sphericity indices, coupled with the low ASG of the particulates, is addressed by the presence of the curable resin coating which provides the requisite consolidation to the plastic bead. Any plastic bead of low ASG and high sphericity, such as those observed with PSDVB beads and polyamide beads, and exhibiting sufficient strength, are acceptable for use in the invention.

The plastic beads may contain varying amounts of the crosslinker to produce materials having varying degree of elasticity. In this regard, any amount of crosslinker suitable for forming elastic material may be employed. Percentages of crosslinker employed may be selected based on the downhole conditions to which the plastic beads are to be used. Typically, the amount of crosslinker in the copolymer is from about 1 to about 30 weight percent, preferably less than or equal to about 10 weight percent.

The curable resin coated plastic beads are prepared by mixing the resin and plastic beads in a vessel at elevated temperatures, typically from about 200 to about 350, preferably around 250° F. An adherent, such as a resin adhesive or tackifying resin, may further be added to the vessel during mixing. The adherent serves to assist the adhesion of the curable resin onto the plastic beads. The heating is terminated when the temperature has reached 250° F. The curable resin coated plastic beads are then cooled to room temperature.

Alternatively, the curable resin coated plastic beads may be prepared by use of fluidized bed or spray coating techniques.

The curable resin coated plastic beads may further be prepared in the presence of a filler in order to increase the strength and/or temperature resistance of the particulates. Typically, the particle size of the filler range from about 100 nm to about 200 μm.

Suitable as fillers are minerals (such as finely divided minerals or finely divided minerals and/or fibers) optionally bound by a suitable organic or inorganic binder. Suitable minerals include fly ash, silica and sand (including fumed silica, quartz sand, and silica flour), alumina, mica, silicates, such as orthosilicates and metasilicates, aluminum silicate and calcium silicate, kaolin, talc, zirconia, boron and glass, such as glass spheres (especially glass microspheres), glass powder, glass beads, glass bubbles, ground glass, borosilicate glass and fiberglass. Suitable fibers include mineral fibers, glass fibers, ceramic fibers, carbon fibers, polymeric fibers, coated fibers (such as nickel coated carbon fibers) and synthetic fibers. Further, suitable fillers include clay, hematite, alkali metal salts, molybdenum disulfide, oil, aluminum flake, stainless steel, silicone, polytetrafluoroethylene, cement, inorganic salts, carbon black, carbon Buckminster fullerenes, carbon nano-tubes, polyhedral oligomeric silsesquioxane, metals, metallic oxides (such as trimanganese tetraoxide), metallic salts (including alkali metal salts), phosphates, borates, calcium carbonate, calcium chloride, calcium bromide, barium sulfate, aluminum flakes, a modified naturally occurring material, crushed nut shells, ground or crushed seed shells, ground or crushed fruit pits, processed wood and organic polymeric materials. Further, the filler may contain a cation selected from the group consisting of alkali metals, alkaline earth metals, ammonium, manganese, and zinc and an anion selected from the group consisting of a halide, an oxide, a carbonate, nitrate, sulfate, acetate and formate.

The amount of filler(s) in the composition is such as to impart the desired ASG. Typically, the amount of filler in the composition is between from about 1 to about 85, more typically between from about 25 to about 60, percent by volume. The amount of filler and polyamide particulate may be adjusted to tailor the composition to achieve the desirable physical properties, including particle density, bulk density, crush strength, etc.

The particle size of the curable resin coated plastic beads may be selected based on anticipated downhole conditions. In this regard, larger particle sizes may be more desirable in situations where a relatively lower strength particulate material is employed. The plastic beads typically have a size ranging from about 4 mesh to about 100 mesh, alternatively from about 20 mesh to about 40 mesh.

The particulates deform with stress and yet are sufficiently strong to be used on their own at high pressures, such as in excess of 4,000 psi. The curable resin coating prevents sand grains and/or other formation fines from migrating into the wellbore.

The curable resin coated plastic beads may be employed with carrier or treatment fluids in order to facilitate placement of the composite to a desired location within the formation. The ASG of the coated beads is generally greater than or equal to the ASG of the carrier fluid. Any carrier fluid suitable for transporting the particulate into a well and/or subterranean formation fracture in communication therewith may be employed including, but not limited to, carrier fluids including a brine, salt water, unviscosified water, fresh water, potassium chloride solution, a saturated sodium chloride solution, liquid hydrocarbons, and/or a gas such as nitrogen or carbon dioxide. In a preferred embodiment, the carrier fluid is unviscosified water or brine.

The carrier fluid may be gelled, non-gelled or have a reduced or lighter gelling requirement. The latter may be referred to as "weakly gelled", i.e., having minimum sufficient polymer, thickening agent, such as a viscosifier, or friction reducer to achieve friction reduction when pumped downhole (e.g., when pumped down tubing, work string, casing, coiled tubing, drill pipe, etc.), and/or may be characterized as having a polymer or viscosifier concentration of from greater than 0 pounds of polymer per thousand gallons of base fluid to about 10 pounds of polymer per thousand gallons of base fluid, and/or as having a viscosity of from about 1 to about 10 centipoises. The non-gelled carrier fluid typically contains no polymer or viscosifer.

The use of a non-gelled carrier fluid eliminates a source of potential packing and/or formation damage and enhancement in the productivity of the well. Elimination of the need to formulate a complex suspension gel may further mean a reduction in tubing friction pressures, particularly in coiled tubing and in the amount of on-location mixing equipment and/or mixing time requirements, as well as reduced costs. In one embodiment employing a substantially neutrally buoyant particulate and a brine carrier fluid, mixing equipment need only include such equipment that is capable of (a) mixing the brine (dissolving soluble salts), and (b) homogeneously dispersing in the substantially neutrally buoyant particulate.

Gelling agents for proppant carrier fluids may provide a source of proppant pack and/or formation damage, and settling of proppant may interfere with proper placement downhole. The resulting suspension preferably forms a pack of particulate material that is permeable to fluids produced from the wellbore and substantially prevents or reduces production of formation materials from the formation into the wellbore.

The carrier fluid may further contain one or more conventional additives to the well service industry such as a gelling agent, crosslinking agent, gel breaker, surfactant, biocide, surface tension reducing agent, foaming agent, defoaming agent, demulsifier, non-emulsifier, scale inhibitor, gas hydrate inhibitor, polymer specific enzyme breaker, oxidative breaker, buffer, clay stabilizer, acid, buffer, solvent or a mixture thereof and other well treatment additives known in the art. The addition of such additives to the carrier fluids minimizes the need for additional pumps required to add such materials on the fly.

The curable resin coated plastic beads may be advantageously pre-suspended as a substantially neutrally buoyant particulate and stored in the carrier fluid (e.g., brine of near or substantially equal density), and then pumped or placed downhole as is, or diluted on the fly.

The term "substantially neutrally buoyant" refers to plastic bead particulates that have an ASG sufficiently close to the ASG of the selected ungelled or weakly gelled carrier fluid (e.g., ungelled or weakly gelled completion brine, other aqueous-based fluid, slick water, or other suitable fluid) which allows pumping and satisfactory placement of the proppant/particulate using the selected ungelled or weakly gelled carrier fluid.

It may be preferred to pump an activator with the slurry into the formation in order to assist bonding of the curable resin particulates and accelerate the downhole curing process. Suitable activators include those commercially available from Santrol of Fresno, Tex. The curable resin coated plastic beads may be introduced into the wellbore at any concentration deemed suitable or effective for the downhole conditions to be encountered.

In a preferred embodiment, the curable resin coated plastic beads and/or substantially neutrally buoyant curable resin coated plastic beads are used in a sand control method. The beads may be introduced into the wellbore in a slurry with a carrier fluid. The beads are placed adjacent the subterranean formation to form a fluid-permeable pack. The fluid permeable pack is capable of reducing or substantially preventing the passage of formation particles from the subterranean formation into the wellbore while at the same time allowing passage of formation fluids from the subterranean formation into the wellbore.

In a preferred gravel pack operation, a screen assembly may be placed or otherwise disposed within the wellbore so that at least a portion of the screen assembly is disposed adjacent the subterranean formation. (The gravel pack operation may further proceed using a screenless pack.) A slurry containing the curable resin coated plastic beads may then be introduced into the wellbore and placed adjacent the subterranean formation by circulation or other suitable method. A fluid-permeable pack is formed in the annular area between the exterior of the screen and the interior of the wellbore which is capable of reducing or substantially preventing the passage of formation particles from the subterranean formation into the wellbore during production of fluids from the formation. At the same time, the permeable pack allows the passage of formation fluids from the subterranean formation through the screen into the wellbore. When the flow is reversed, the consolidated curable resin coated plastic beads will flow back with minimal formation sands. Particularly advantageous results are obtained in horizontal gravel packing which are large, such as those 6,000 ft long.

The curable resin coated plastic beads may be mixed with the carrier fluid in any manner suitable for delivering the mixture to a wellbore and/or subterranean formation. In one embodiment, the disclosed particulates may be injected into a subterranean formation in conjunction with a hydraulic fracturing treatment or other treatment at pressures sufficiently high enough to cause the formation or enlargement of fractures, or to otherwise expose the particles to formation closure stress. Such other treatments may be near wellbore in nature (affecting near wellbore regions) and may be directed toward improving wellbore productivity and/or controlling the production of fracture proppant or formation sand.

The curable resin coated plastic beads are further employed in frac-pack operations, especially in unconsolidated and semi-consolidated formations in order to facilitate fluid recovery while preventing particulate migration. The frac-pack operation typically embodies the features of both a fracturing operation and a gravel packing operation. The unconsolidated formation may initially be fractured using the particulate materials. Additional proppant may then be held in place in the wellbore by (a) packing the material around a gravel packing screen and/or (b) consolidating the proppant material by means of a resin coating.

The following examples will illustrate the practice of the present invention in its preferred embodiments. Other embodiments within the scope of the claims herein will be apparent to one skilled in the art from consideration of the specification and practice of the invention as disclosed herein.

It is intended that the specification, together with the Examples, be considered exemplary only, with the scope and spirit of the invention being indicated by the claims which follow.

EXAMPLES

Example 1

This Example illustrates the ability of curable resin coated PSDVB beads withstand greater than 20 psi stress without breaking.

Curable phenolic resin coated polystyrene divinylbenzene (PSDVB) beads (containing 10 weight percent divinylbenzene) were prepared by heating the beads in the presence of 7.5% (wt) of phenolic resin. As the temperature increased, the resin melted. The higher the temperature, the quicker the resin cured. At the point where the phenolic resin became to demonstrate signs of a "breakout" or "dryout" where the beads separated, heat was removed to limit the amount of curing.

A core was made by mixing 100 grams of the resulting curable resin coated PSDVB beads with about 100 ml of 2% potassium chloride solution and from 0 to 15 gallons per thousand (gpt) (1.5 volume percent) of activator, commercially available from Santrol as SuperSet P™. The resulting slurry was introduced into a two-inch diameter high pressure high temperature (HPHT) 500 ml stainless steel cell. Excess fluid was then displaced from the cell when nitrogen gas was applied to the movable piston. 500 psi pressure was then applied to the piston and the cell was heated to either 70° F. or 100° F. After four hours, the external heat source was terminated and the pressure was released. After cooling and removing the formed core from the cell, the core was placed between two parallel platens until a stress was reached where the core failed. This unconfined compressive strength (UCS) of the samples is set forth in Table I.

TABLE I

| Sample | Activator Amount (gpt) | Temperature, ° F. | UCS (psi) |
|---|---|---|---|
| A | 15 | 100 | 28.00 |
| B | 10 | 100 | 6.41 |
| C | 4.2 | 100 | 6.60 |
| D | 0 | 100 | 3.40 |
| E | 10 | 70 | 7.90 |
| F | 5 | 70 | 4.90 |
| G | 0 | 70 | 2.70 |

This unconfined compressive strength (UCS) test showed the ability of the curable resin coated PSDVB beads of the invention to exceed stress levels of 20 psi and is a measurement of the ability of the beads to adhere together. The compressive strength and permeability of the curable resin coated PSDVB beads are shown to be higher at 100° F. than at 70° F. This is further illustrated in FIG. 1.

Example 2

This Example illustrates the insolubility of the curable resin coated particulates of the invention in acid media.

PSDVB beads (containing 10 weight percent divinylbenzene) having a phenolic curable resin coating were prepared in a manner similar to that set forth in Example 1 above. The particulate exhibited a tan color with fine particles ranging in color from dark brown to light orange. Samples were dried for one hour at 150° F. in order to obtain a constant weight. Acid solubility tests were then conducted with the sample at room temperature in 15% HCl and 12% HCl-3% HF systems. Each acid solubility test was run in triplicate. In each test, a 5.0 gram sample of the particulate was added to a plastic bottle and 100 ml aliquot of acid was added. Each sample bottle was then thoroughly mixed and allowed to stand for one hour at 70° F. After the one-hour incubation period, the acid and the particulate solids were filtered through a Whatman #1 filter paper to collect the remaining solids. After complete filtration of the acid, the solids were washed with distilled water to remove any remaining acid. The collected solids were placed in a 150° F. oven for one hour for drying. After drying, the remaining solids were removed from the Whatman #1 filter paper and their weight was determined on a balance. The final weight of the solids was utilized to determine the percent acid solubility. Acid solubilities were calculated by the following formula:

$$\frac{\text{Initial weight} - \text{final weight}}{\text{Initial weight}} = \% \text{ solids dissolved}$$

The results are set forth in Table II below.

TABLE II

| Sample | Acid System | Initial Weight | Final Weight | % Acid Solubility |
|---|---|---|---|---|
| A | 15% HCl | 5.00 | 4.97 | 0.006 |
| B | 15% HCl | 5.00 | 4.96 | 0.008 |
| C | 15% HCl | 5.00 | 4.96 | 0.008 |
| D | 12% HCl—3% HF | 5.00 | 4.98 | 0.004 |
| E | 12% HCl—3% HF | 5.00 | 4.95 | 0.01 |
| F | 12% HCl—3% HF | 5.00 | 4.97 | 0.006 |

Table II shows that the curable resin coated PSDVB particulate exhibits very low acid solubility in 15% HCl and 12% HCl-3% HF systems.

Example 3

A phenolic curable resin coated PSDVB particulate was prepared as set forth above in Example 1. Conductivity tests were performed on the phenolic curable resin coated PSDVB particulate as well as the uncoated PSDVB particulate in accordance with a modified API RP 61 ($1^{st}$ Revision, Oct. 1, 1989) using an API conductivity cell with Ohio sandstone wafer side inserts to simulate the producing formation. A multilayer pack of the composite containing about 31.5 g of particulate was then loaded between the sealed sandstone wafers to increase the propped width. The conductivity cell was then placed on a press while stress was applied at 100 psi/minute until the target temperature was reached. Fluid was then allowed to flow through the test pack maintaining Darcy flow. The differential pressure was measured across 5 inches of the pack using a "ROSEMOUNT" differential pressure transducer (#3051C). Flow was measured using Micromotion mass flow meters and data points were recorded every 2 minutes for 50 hours. An Isco 260D programmable pump applied and maintained effective closure pressure. Experimental parameters and results are set forth in Tables III and IV for the curable resin coated PSDVB particulate and the uncoated PSDVB particulate, respectively.

TABLE III

Temperature: 150° F.
Particulate Size: 16/40

| Time, Hours | Closure, Psi | Conductivity, md-ft | Width, Inches | Permeability, Darcies |
|---|---|---|---|---|
| 0 | 1008 | 1926 | 0.235 | 98 |
| 10 | 994 | 1565 | 0.232 | 81 |
| 24 | 994 | 1432 | 0.232 | 74 |
| 0 | 2013 | 1243 | 0.227 | 66 |
| 10 | 2012 | 822 | 0.220 | 45 |
| 20 | 2011 | 709 | 0.216 | 39 |
| 24 | 2014 | 684 | 0.216 | 38 |

TABLE IV

Temperature: 150° F.
Particulate Size: 20/40

| Time, Hours | Closure, Psi | Conductivity, md-ft | Width, inches | Permeability, Darcies |
|---|---|---|---|---|
| 0 | 992 | 1081 | 0.226 | 57 |
| 10 | 988 | 742 | 0.220 | 40 |
| 24 | 994 | 665 | 0.217 | 37 |
| 0 | 2005 | 544 | 0.212 | 31 |
| 10 | 2003 | 308 | 0.205 | 18 |
| 20 | 2003 | 270 | 0.200 | 16 |
| 24 | 2004 | 255 | 0.200 | 15 |

Tables III and IV illustrate increased permeability and conductivity with the curable resin coated PSDVB beads versus the uncoated PSDVB beads, respectively.

Example 4

The phenolic curable resin coated PSDVB particulate and uncoated PSDVB particulate op Example 3 were tested in accordance with Example 3. Experimental conditions and results are set forth in Tables V and VI, respectively.

TABLE V

Temperature: 100° F.
Particulate Size: 16/40

| Time, Hours | Closure, Psi | Conductivity, md-ft | Width, inches | Permeability, Darcies |
|---|---|---|---|---|
| 0 | 58 | 8021 | 0.282 | 341 |
| 10 | 46 | 7650 | 0.282 | 326 |
| 24 | 41 | 7936 | 0.282 | 338 |
| 0 | 496 | 7239 | 0.2350 | 370 |
| 10 | 496 | 6637 | 0.2350 | 339 |
| 20 | 497 | 6621 | 0.2320 | 342 |
| 24 | 496 | 6812 | 0.2320 | 352 |

TABLE VI

Temperature: 100° F.
Particulate Size: 20/40

| Time, Hours | Closure, Psi | Conductivity, md-ft | Width, inches | Permeability, Darcies |
|---|---|---|---|---|
| 0 | 52 | 3713 | 0.247 | 180 |
| 10 | 49 | 4398 | 0.247 | 214 |
| 24 | 40 | 4778 | 0.247 | 232 |
| 0 | 143 | 4393 | 0.247 | 213 |
| 10 | 513 | 3697 | 0.233 | 190 |
| 20 | 512 | 3427 | 0.228 | 180 |
| 24 | 513 | 3435 | 0.228 | 181 |

Tables V and VI illustrate increased permeability and conductivity with the curable resin coated PSDVB beads versus the uncoated PSDVB beads at lower temperatures and at 500 psi closure stress (as compared to the data set forth in Tables III and IV) above.

From the foregoing, it will be observed that numerous variations and modifications may be effected without departing from the true spirit and scope of the novel concepts of the invention.

What is claimed is:

1. A coated plastic bead for treating a wellbore, wherein the coated plastic bead comprises a plastic bead and a curable resin coating and further wherein, when formulated into a pack, exhibits greater conductivity and permeability at a closure stress greater than or equal to 41 psi than a substantially similar plastic bead not containing the curable resin, when formulated into a pack.

2. The coated plastic bead of claim 1, wherein the plastic bead comprises a polystyrene divinylbenzene or a polyamide or a derivative thereof.

3. A proppant or sand control particulate comprising the coated plastic bead of claim 2.

4. The coated plastic bead of claim 2, wherein the plastic bead comprises a polystyrene divinylbenzene or a derivative thereof.

5. The coated plastic bead of claim 2, wherein the plastic bead comprises a polyamide.

6. The coated plastic bead of claim 4, wherein the amount of divinylbenzene in the polystyrene divinylbenzene is between from about 1 to about 30 weight percent.

7. The coated plastic bead of claim 6, wherein the amount of divinylbenzene in the polystyrene divinylbenzene is less than about 10 weight percent.

8. The coated plastic bead of claim 2, wherein the apparent specific gravity of the plastic bead is less than or equal to 1.5.

9. The coated plastic bead of claim 4, wherein the apparent specific gravity of the plastic bead is about 1.05.

10. The coated plastic bead of claim 2, wherein the curable resin coating is selected from the group consisting of phenolic resins, epoxy resins, furan resins, phenolic formaldehyde resins, melamine formaldehyde resins, urethane resins and phenolic and furan resin mixtures.

11. A method of treating a well which comprises introducing into the well a composition comprising the coated plastic bead of claim 2 and a carrier fluid.

12. The method of claim 11, wherein the composition further comprises at least one filler.

13. The method of claim 12, wherein the at least one filler is selected from the group consisting of minerals, clay, hematite, kaolin, molybdenum disulfide, oil, alumina, aluminum flake, stainless steel, silicone, polytetrafluoroethylene, cement, inorganic salts, carbon black, carbon Buckminster fullerenes, carbon nano-tubes, polyhedral oligomeric silsesquioxane, metals, metallic oxides, metallic salts, phosphates, borates, aluminum flakes, a modified naturally occurring material, crushed nut shells, ground or crushed seed shells, ground or crushed fruit pits, processed wood and organic polymeric materials or the at least one filler contains a cation selected from the group consisting of alkali metals, alkaline earth metals, ammonium, manganese and zinc and an anion selected from the group consisting of a halide, an oxide, a carbonate, nitrate, sulfate, acetate and formate.

14. The method of claim 12, wherein the at least one filler is selected from the group consisting of fly ash, silica, alumina, mica, silicates, kaolin, talc, zirconia, boron, glass, mineral fibers, ceramic fibers, carbon fibers and polymeric and/or synthetic fibers, calcium carbonate, calcium chloride, calcium bromide, barium sulfate and aluminum flakes.

15. The method of claim 12, wherein the amount of filler in the composition is between from about 1 to about 85 volume percent.

16. The method of claim 11, wherein the apparent specific gravity of the plastic bead is less than or equal to 1.5.

17. The method of claim 11, wherein the plastic bead comprises a polystyrene divinylbenzene or a derivative thereof.

18. The method of claim 11, wherein the plastic bead comprises a polyamide.

19. The method of claim 17, wherein the amount of divinylbenzene in the polystyrene divinylbenzene is between from about 3 to about 10 weight percent.

20. The method of claim 16, wherein the apparent specific gravity of the plastic bead is less than or equal to 1.15.

21. The method of claim 20, wherein the apparent specific gravity of the plastic bead is less than about 1.07.

22. The method of claim 11, wherein the curable resin coating is selected from the group consisting of phenolic resins, epoxy resins, furan resins, phenolic formaldehyde resins, melamine formaldehyde resins, urethane resins and phenolic and furan resin mixtures.

23. The method of claim 11, wherein the coated plastic bead and carrier fluid are introduced into the subterranean formation as part of a sand control and/or hydraulic fracturing operation.

24. A sand control method for a wellbore penetrating a subterranean formation, comprising:
    introducing into the wellbore a slurry comprising a coated plastic bead of claim 2 and a carrier fluid;
    placing the coated plastic bead adjacent the subterranean formation to form a fluid-permeable pack that is capable of reducing or substantially preventing the passage of formation particles from the subterranean formation into the wellbore while at the same time allowing passage of formation fluids from the subterranean formation into the wellbore.

25. The method of claim 24, wherein the plastic bead is a polystyrene divinylbenzene or a derivative thereof.

26. The method of claim 24, wherein the plastic bead is a polyamide or a derivative thereof.

27. The method of claim 24, wherein the carrier fluid is unviscosified water or brine.

28. The method of claim 24, wherein the fluid permeable pack is formed in the absence of a screen.

29. A method of treating a wellbore comprising the steps of placing a screening device in the wellbore and then injecting a treating composition into the wellbore, wherein the treating composition comprises a carrier fluid and a curable resin coated plastic bead of claim 2, and further wherein the treating composition is injected into the wellbore such that the curable resin coated plastic bead is packed around the exterior of the screening device to provide a fluid permeable barrier around the screening device which is operable for preventing the migration of formation particulates into the screening device.

30. A method of treating a subterranean formation penetrated by a wellbore by introducing into the formation coated plastic beads comprising plastic beads and a curable resin coating wherein the thickness of the curable resin coating on the plastic beads is between from about 0.5 to about 4 microns and further wherein the propensity of flowback of the coated plastic beads during treatment of the well is diminished by the presence of the curable resin coating on the plastic beads.

31. The method of claim 30, wherein the plastic beads of the curable resin coated plastic beads comprises a polystyrene divinylbenzene or a polyamide or a derivative thereof.

32. The coated plastic bead of claim 1, wherein the thickness of the curable resin on the coated plastic bead is between from about 0.5 to about 4 microns.

33. The method of claim 11, wherein the thickness of the curable resin on the coated plastic bead is between from about 0.5 to about 4 microns.

34. The method of claim 29, wherein the thickness of the curable resin on the coated plastic bead is between from about 0.5 to about 4 microns.

* * * * *